United States Patent
Wilson et al.

(10) Patent No.: US 10,016,820 B2
(45) Date of Patent: Jul. 10, 2018

(54) DRILL PLATE ASSEMBLIES

(71) Applicant: The Boeing Company, Chicago, IL (US)

(72) Inventors: Jake A. Wilson, Charleston, SC (US); Andrew M. Huckey, Charleston, SC (US); Mark E. Nestleroad, Charleston, SC (US); Craig A. Charlton, Charleston, SC (US)

(73) Assignee: The Boeing Company, Chicago, IL (US)

( * ) Notice: Subject to any disclaimer, the term of this patent is extended or adjusted under 35 U.S.C. 154(b) by 54 days.

(21) Appl. No.: 15/019,930

(22) Filed: Feb. 9, 2016

(65) Prior Publication Data

US 2017/0225240 A1    Aug. 10, 2017

(51) Int. Cl.
   *B23B 49/02*     (2006.01)
   *B23B 51/06*     (2006.01)
   *B23Q 11/00*     (2006.01)

(52) U.S. Cl.
   CPC .............. *B23B 49/02* (2013.01); *B23B 51/06* (2013.01); *B23B 2215/04* (2013.01); *B23B 2250/12* (2013.01); *B23B 2260/126* (2013.01); *B23Q 11/0075* (2013.01); *Y02P 70/171* (2015.11); *Y10T 408/455* (2015.01); *Y10T 408/569* (2015.01)

(58) Field of Classification Search
   CPC ..... B23B 49/02; B23B 2215/04; B23Q 11/02; B23Q 11/0042; B23Q 11/0071; B23Q 11/0075; B08B 15/04; B28D 7/02; B28D 1/14
   See application file for complete search history.

(56) References Cited

U.S. PATENT DOCUMENTS

| | | | | |
|---|---|---|---|---|
| 2,638,084 A | * | 5/1953 | McLaughlin | B23Q 11/1007 408/1 R |
| 2,847,880 A | * | 8/1958 | Neidig | B23Q 11/10 184/15.1 |
| 3,648,508 A | * | 3/1972 | Hougen | B23B 51/0426 407/1 |
| 5,333,973 A | * | 8/1994 | Hoshino | B23Q 11/10 408/56 |
| 5,667,565 A | * | 9/1997 | Gondar | B03C 3/017 15/1.52 |

(Continued)

FOREIGN PATENT DOCUMENTS

| | | | | |
|---|---|---|---|---|
| CN | 104626071 A | * | 5/2015 | |
| DE | 102006004188 A1 | * | 8/2007 | B23B 49/026 |

(Continued)

OTHER PUBLICATIONS

EPO machine translation of FR 2924959, printed May 2017.*
EPO machine translation of CN 104626071, printed May 2017.*
EPO machine translation of DE 102006004188, printed May 2017.*

*Primary Examiner* — Daniel Howell
(74) *Attorney, Agent, or Firm* — Hanley, Flight & Zimmerman, LLC

(57) ABSTRACT

Drill plate assemblies are disclosed in the examples herein. An example method includes positioning an absorbent material between a drill plate and a surface to be drilled; performing a drilling operation on the surface including flowing coolant through the drill; and capturing at least some of the coolant in the absorbent material.

22 Claims, 6 Drawing Sheets

(56) References Cited

U.S. PATENT DOCUMENTS

| | | | |
|---|---|---|---|
| 7,195,429 B2* | 3/2007 | Dods | B23B 47/287 |
| | | | 408/115 R |
| 8,016,522 B2* | 9/2011 | Chen | B23B 49/026 |
| | | | 408/115 R |
| 8,757,937 B1 | 6/2014 | Inman et al. | |
| 9,296,497 B2* | 3/2016 | Suoniemi | B23Q 11/0042 |
| 2010/0021252 A1* | 1/2010 | Leckey | B08B 15/04 |
| | | | 408/67 |
| 2013/0094915 A1* | 4/2013 | Chen | B23Q 11/0071 |
| | | | 408/67 |

FOREIGN PATENT DOCUMENTS

| | | | | |
|---|---|---|---|---|
| DE | 102009054779 A1 * | 6/2011 | | B23B 49/026 |
| EP | 1702713 A1 * | 9/2006 | | B08B 15/04 |
| FR | 2924959 A1 * | 6/2009 | | B23B 49/026 |
| FR | 3028768 A1 * | 5/2016 | | B23Q 11/0071 |
| FR | 3031684 A1 * | 7/2016 | | B23Q 11/0071 |
| FR | 3032368 A1 * | 8/2016 | | B23Q 11/0071 |
| JP | 10086138 A * | 4/1998 | | |
| JP | 11034040 A * | 2/1999 | | B28D 1/041 |
| JP | 2001018217 A * | 1/2001 | | |
| JP | 2008260079 A * | 10/2008 | | |
| SU | 814655 A1 * | 3/1981 | | B23Q 11/0042 |

* cited by examiner

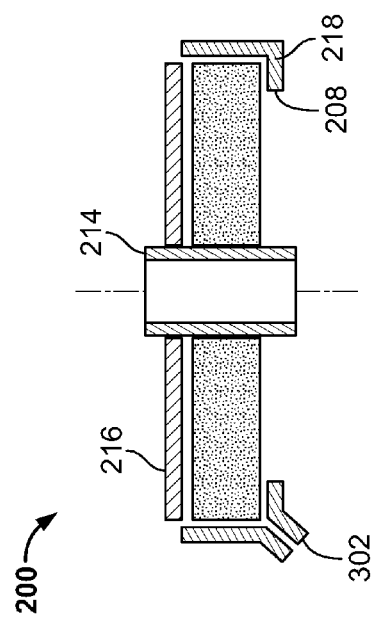
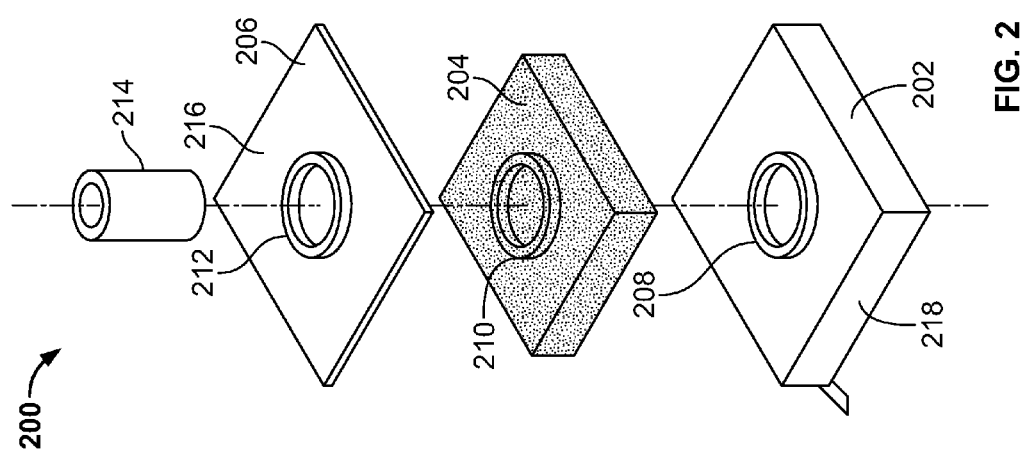

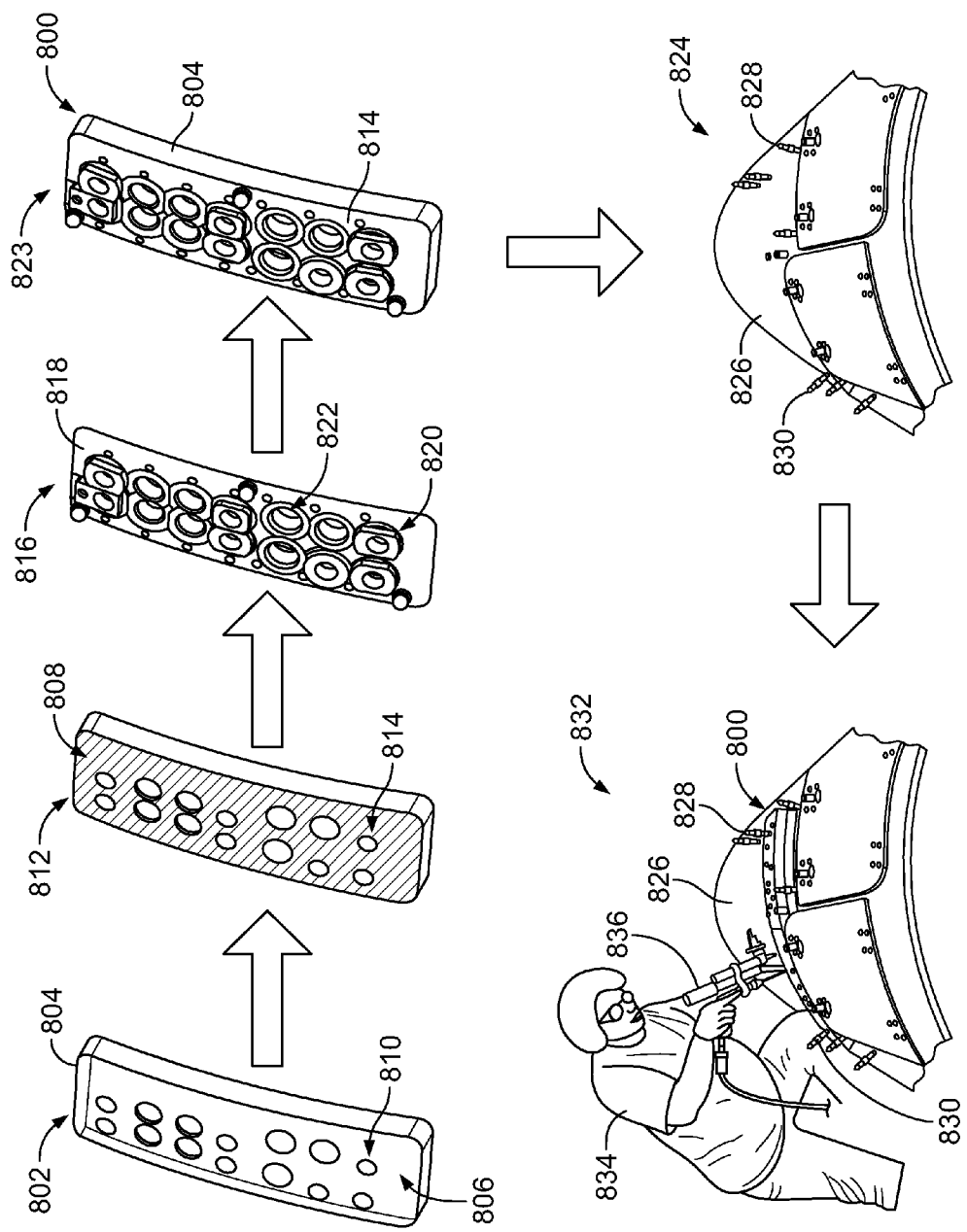

DRILL PLATE ASSEMBLIES

FIELD OF THE DISCLOSURE

This disclosure relates generally to drilling processes and apparatus, and, more particularly, to drill plate assemblies.

BACKGROUND

In some drilling operations, coolant is fed through a drill bit to increase the useful life of the drill bit and/or to increase the quality of the hole being drilled.

BRIEF DESCRIPTION OF THE DRAWINGS

FIG. 2 is an expanded view of an example drill plate assembly.

FIG. 3 is a cross-sectional view of the example plate assembly of FIG. 2.

FIG. 8 is an example process diagram illustrating processes of assembling and using an example drill plate assembly in accordance with the teachings of this disclosure.

The figures are not to scale. Wherever possible, the same reference numbers will be used throughout the drawing(s) and accompanying written description to refer to the same or like parts.

DETAILED DESCRIPTION

Figure 1:
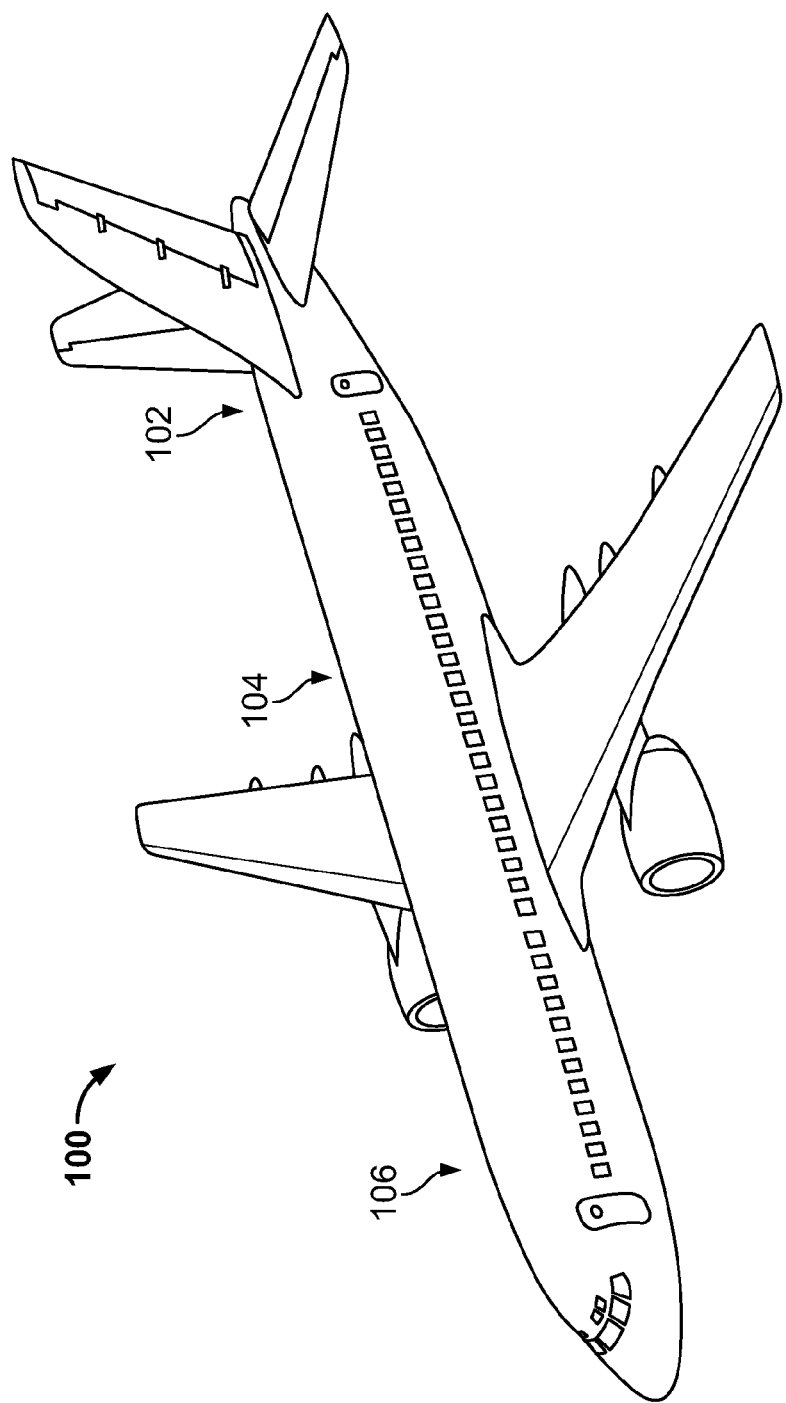
FIG. 1 is an illustration of an example aircraft that can be produced using example drill plate assemblies disclosed herein.

When assembling an aircraft, an aft fuselage, a middle fuselage and/or a forward fuselage may be coupled using fasteners (e.g., bolts, rivets, etc.). In some examples, to enable the different fuselages to receive the fasteners, example drilling operations are performed on the fuselages. To increase the useful life of drill bits used in some example drilling operations, coolant is fed through the drill bit. However, unless such drilling operations are performed within a confined area or unless expensive and/or cumbersome and complex example removal systems are used, using coolant fed drill bits may cause coolant and/or other debris to accumulate within the work area.

To enable work areas in which example drilling operations are performed to remain relatively clean and/or to reduce cleanup time associated with some example drilling operations, the examples disclosed herein relate to drill plate assemblies that accumulate the coolant and/or cuttings within the drill plate assembly. Thus, the coolant and/or the cuttings produced during the drilling operation may be confined to being within the example housing and/or absorbent material of the drill plate assembly during a drilling operation.

In some examples, the example drill plate assemblies include an example tray that receives absorbent material and/or to which an example drill plate is to be coupled. In some examples, the drill plate, the absorbent material and/or the example tray include aligned apertures through which a drill bit passes during the example drilling operation. In some examples, a bushing extends through the respective apertures between a front surface of the drill plate assembly to which the drill is to be coupled and a rear surface of the drill plate assembly adjacent to the surface being drilled.

In some examples, to enable the absorbent material to be positioned immediately adjacent the surface being drilled, the example tray includes an aperture sized to enable the absorbent material to receive the coolant and/or chips produced during the drilling operation. In some examples, to enable the absorbent material to be positioned immediately adjacent the surface being drilled, the example tray may not include a bottom surface. In some examples, the tray includes a drain to enable coolant to be discarded from the tray and/or to accumulate in a container coupled to the drill plate assembly (e.g., via a tube or other flow channel). In some examples, the discharged coolant may be filtered and/or reused during the drilling operation and/or during a different drilling operation.

In other examples, the example drill plate assemblies include example absorbent material coupled to and/or positioned adjacent to an example drill plate during an example drilling operation. In some examples, the drill plate and the absorbent material include aligned apertures through which the drill passes during the example drilling operation. In some examples, a bushing extends through the respective apertures between a front surface of the drill plate assembly to which the drill is to be coupled and a rear surface of the drill plate assembly adjacent to the surface being drilled. In some examples, the absorbent material and the bushing are coaxial and/or have a similarly shaped cross-section (e.g., circular). In other examples, the cross-section of the bushing and the absorbent material are different.

If a drilling operation is performed using the example drill plate assemblies disclosed herein, coolant and cuttings may accumulate within the housing and/or within the absorbent material. In other words, more coolant and/or cuttings may be confined to a particular area using the examples disclosed herein as compared to drilling operations performed without the use of the example drill plate assemblies. In some examples, after the drilling operation is performed, the drill plate assembly is removed from the drilled surface and taken to an area where the coolant and/or cuttings are accessed for disposal and/or recycling. In some examples, after the drilling operation is performed, the example drill plate is decoupled from the housing and/or from the absorbent material to enable the coolant and/or the cuttings to be easily accessed for disposal, recycling, etc.

FIG. 1 is an illustration of an example aircraft 100 that can be assembled using the example drill plate assemblies disclosed herein. In some examples, the aircraft 100 includes an example aft fuselage 102, an example center fuselage 104 and an example forward fuselage 106. In this example, the aft fuselage 102 is coupled to the center fuselage 104 and the forward fuselage 106 is coupled to the center fuselage 104.

FIG. 2 illustrates an expanded view of an example drill plate assembly 200 that can be used to produce the example aircraft 100 of FIG. 1. In the illustrated example, the drill plate assembly 200 includes a housing and/or tray 202, absorbent material 204 and a cover 206 to enclose the absorbent material 204 within the housing 202. The absorbent material 204 may include cotton and/or water absorbing crystals. In this example, the housing 202, the absorbent material 204 and the cover 206 define coaxial first, second and third apertures 208, 210, 212 to enable an example bushing 214 to extend through the drill plate assembly 200 between a first surface 216 of the cover 206 and a second surface 218 of the housing 202. In some examples, the third aperture 212 is sized to enable the absorbent material 204 to come into contact with and/or trap coolant and/or cuttings during a drilling operation. In some examples, the bushing 214 includes fixtures to facilitate the coupling of a drill to the drill plate assembly 200. In some examples, the bushing 214 is used during a drilling operation to guide the drill bit through the drill plate assembly 200.

FIG. 3 illustrates a cross-sectional view of the drill plate assembly 200 showing the absorbent material 204 disposed within the housing 202 and the cover 206 coupled to the housing 202. The cover 206 may be coupled to the housing 202 with fasteners, latches, channel locks, slots and/or tabs, a weld, etc. and/or via the bushing 214. For example, a first interference fit and/or coupling may be formed at the second aperture 210 between the absorbent material 204 and the bushing 214 and a second interference fit and/or coupling may be formed at the third aperture 212 between the cover 206 and the bushing 214.

In the illustrated example, the housing 202 defines a drain 302 to enable excess drilling fluid to be discharged during a drilling operation. In some examples, the discharged drilling fluid may be collected in a reservoir for re-use, disposal, recycling, etc.

To enable coolant, drilling fluid and/or other debris to come into contact with the absorbent material 204 when a drill bit extends through the bushing 214 during a drilling operation, the first aperture 208 is sized to enable the absorbent material 204 to be positioned immediately adjacent a surface to be drilled. In some examples, as the coolant and/or cuttings come into contact with the drill plate assembly 200, the coolant and/or cuttings become trapped within the absorbent material 204, the housing 202 and, more generally, within the drill plate assembly 200, to substantially prevent the coolant, drilling fluid and/or other debris from accumulating outside of the drill plate assembly 200.

Figure 4:
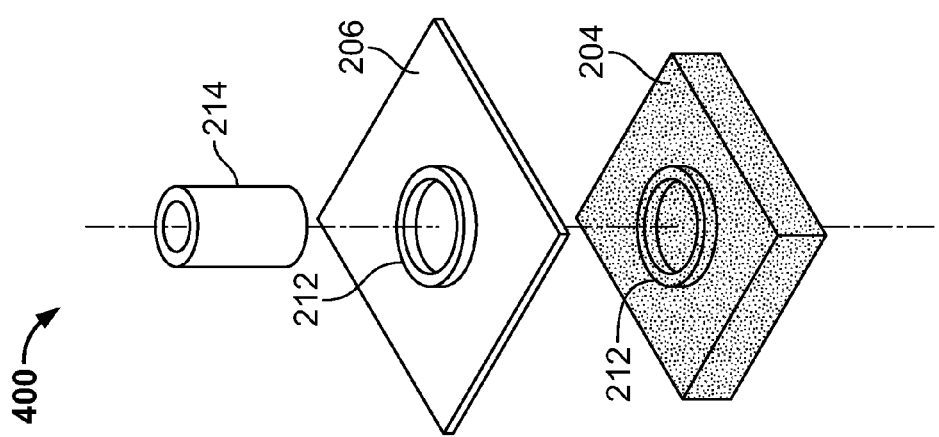
FIG. 4 is an expanded view of another example drill plate assembly.

FIG. 4 illustrates an expanded view of an example drill plate assembly 400 that can be used to produce the example aircraft 100 of FIG. 1. In the illustrated example, the drill plate assembly 400 includes the absorbent material 204 and the cover 206 that define the coaxial apertures 210, 212 to enable the example bushing 214 to extend therethrough. The bushing 214 may be coupled to the cover 206 via a fastener and/or an interference fit.

Figure 5:
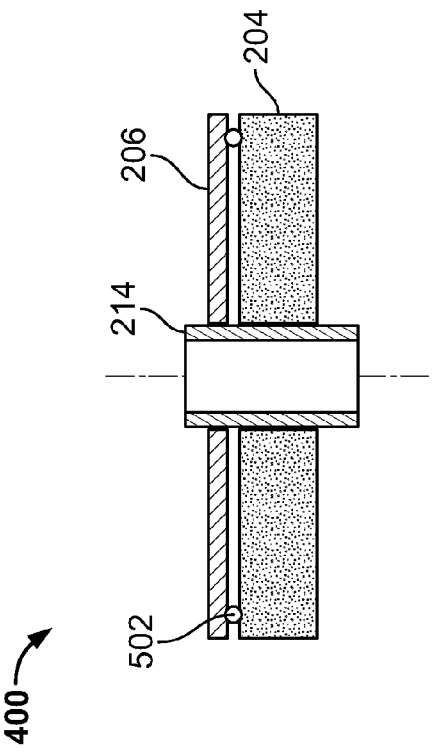
FIG. 5 is a cross-sectional view of the example drill plate assembly of FIG. 4.

FIG. 5 illustrates a cross-sectional view of the drill plate assembly 400 in which the bushing 214 extends through the absorbent material 204 and the cover 206. In some examples, the absorbent material 204 is coupled to the cover 206 via a fastener 502. The fastener 502 may be adhesive, tape, glue, a strap, etc. In some examples, the absorbent material 204 is coupled to the bushing 214 via an interference fit.

To enable coolant, drilling fluid and/or other debris to come into contact with the absorbent material 204 when a drill extends through the bushing 214 during a drilling operation, the absorbent material 204 is positioned immediately adjacent a surface to be drilled. In some examples, as the coolant and/or cuttings come into contact with the drill plate assembly 400, the coolant and/or cuttings become trapped within the absorbent material 204 and, more generally, within the drill plate assembly 400, to substantially prevent the coolant, drilling fluid and/or other debris from accumulating outside of the drill plate assembly 400.

Figure 6:
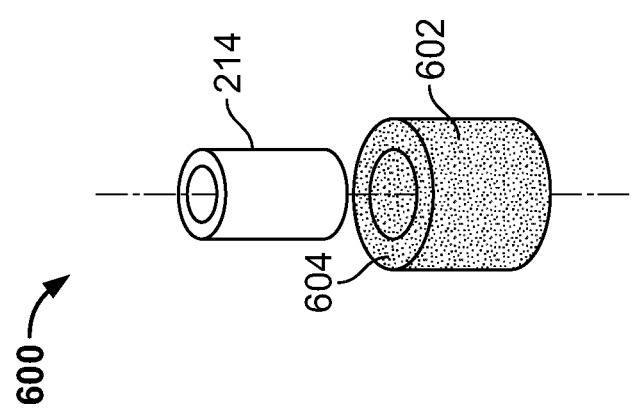
FIG. 6 is an expanded view of another example drill plate assembly.

FIG. 6 illustrates an expanded view of an example drill plate assembly 600 that can be used to produce the example aircraft 100 of FIG. 1. In contrast to the example drill plate assemblies 200, 400 of FIGS. 2-4, the example drill plate assembly 600 may be directly coupled to a drill 702 to enable a drilling operation to be performed by an operator without the use of a stationary template and/or jig (e.g., compare to FIG. 8). Thus, the drill plate assembly 600 may include a fixture(s) to enable the coupling with the drill 702.

In the illustrated example, the drill plate assembly 600 includes an absorbent material 602 that defines an aperture 604 to enable the example bushing 214 to extend through the absorbent material 602. The absorbent material 602 of FIG. 6 is similar to the absorbent material 204 of FIGS. 2-5. However, the absorbent material 602 of FIG. 6 is formed to have a different shape than the absorbent material 204 of FIGS. 2-5.

Figure 7:
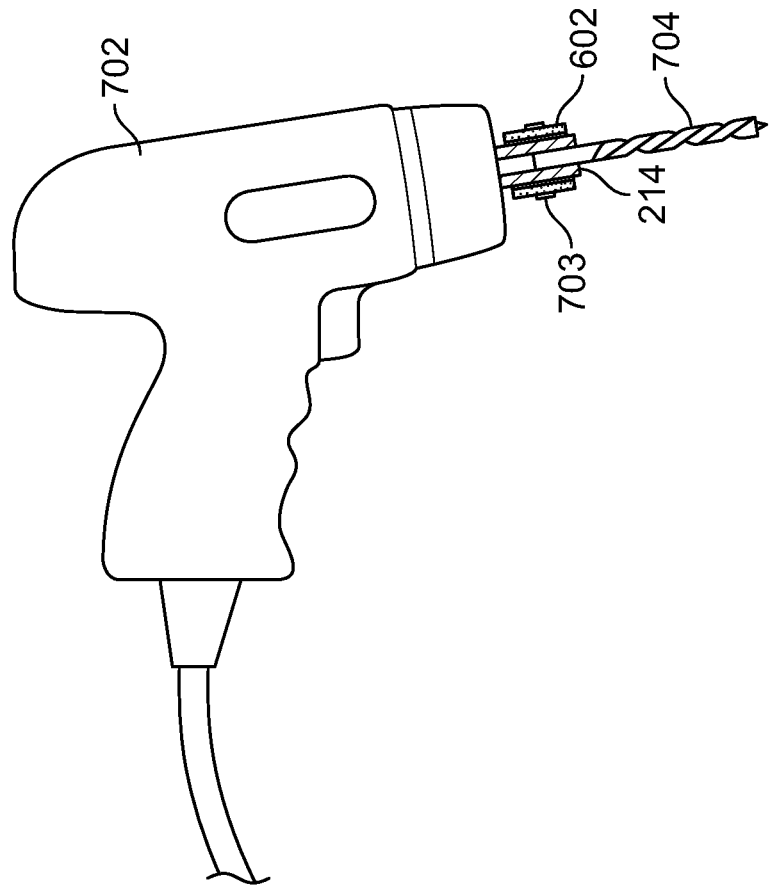
FIG. 7 illustrates the example plate assembly of FIG. 6 coupled to an example drill.

FIG. 7 illustrates a cross-sectional view of the drill plate assembly 600 in which the bushing 214 extends through the absorbent material 602 and the bushing 214 and/or the absorbent material 602 is coupled to the drill 702. In some examples, the bushing 214 includes a fixture(s) to enable coupling with the drill 702. In some examples, the absorbent material 602 is coupled to the bushing 214 and/or the drill 702 via a fastener 703. The fastener 703 may be a strap, a zip-tie, etc.

To enable coolant, drilling fluid and/or other debris to come into contact with the absorbent material 602 when a drill bit 704 extends through the bushing 214 during a drilling operation, the absorbent material 602 is positioned immediately adjacent an end of the drill bit 704 and/or positioned immediately adjacent a surface to be drilled. In some examples, as the coolant and/or cuttings come into contact with the drill plate assembly 600, the coolant and/or cuttings become trapped within the absorbent material 602 and, more generally, within the drill plate assembly 600, to substantially deter the coolant, drilling fluid and/or other debris from accumulating outside of the drill plate assembly 600.

FIG. 8 illustrates an example process of assembling and using an example drill plate assembly 800 in accordance with the teachings of this disclosure. Reference number 802 illustrates an example housing and/or tray 804 that can be used to implement the example drill plate assemblies disclosed herein. In the illustrated example, the housing 804 defines a cavity and/or area 806 to receive absorbent material 808 and first apertures 810 corresponding to a drill pattern to be drilled. Reference number 812 illustrates the absorbent material 808 disposed within the cavity 806 of the housing 804. In the illustrated example, the absorbent material 808 defines second apertures 814 that are substantially coaxial with the first apertures 810. As set forth herein, substantially coaxial means within about 5-degrees of coaxial and/or accounts for manufacturing tolerances.

In some examples, the first apertures 810 are larger than the second apertures 814 to enable the absorbent material 808 to receive and/or come into contact with coolant and/or cuttings present during a drilling operation. In some examples, the housing 804 may not include a bottom and, thus, may not include the first apertures 810. In such examples, the housing 804 may be used to deflect coolant spray while enabling the absorbent material 808 to be immediately adjacent the surface being drilled. The absorbent material 808 may include batting or any other material that facilitates the accumulation and/or retention of coolant, cuttings and/or other debris within the drill plate assembly 800.

Reference number 816 illustrates an example drill plate 818 that can be used to implement the examples disclosed herein. In the illustrated example, the drill plate 818 defines third apertures 820 corresponding to a drill pattern to be drilled. In the illustrated example, bushings 822 are disposed within the third apertures 820 to facilitate the coupling of a drill to the drill plate 818 and/or to guide a drill bit through the drill plate assembly 800. When coupled to the housing 804, the bushings 822 extends through the drill plate 818 assembly 800 from a front surface of the drill plate assembly 800 to a rear surface of the drill plate assembly 800. Reference number 823 illustrates the drill plate 818 coupled to the housing 804 to enclose and/or encapsulate the absorbent material 808 (e.g., the front and/or the sides of the absorbent material 808 may be enclosed) and/or to form the example drill plate assembly 800.

Reference number 824 illustrates an example surface 826 to be drilled using the example drill plate assembly 800. The surface 826 may be a surface of a vehicle, a surface of an aircraft, a surface of a fuselage, etc. In the illustrated example, to couple the drill plate assembly 800 to the surface 826, fasteners 828, 830 extend from the surface 826. In some examples, the fasteners 828, 830 include spacers to off-set the example drill plate assembly 800 from the surface 826 and/or to enable the coolant and/or cuttings to be received by the drill plate assembly 800. At reference number 832, the example drill plate assembly 800 is illustrated indexed and/or coupled relative to the surface 826 via the fasteners 828, 830. In the illustrated example, the housing 804 has a contour that corresponds to a contour of the surface 826. At reference number 832, an operator 834 is illustrated performing a drilling operation on the surface 826 using a drill 836 and the example drill plate assembly 800. As illustrated in the example of FIG. 8, the drill 836 is coupled to a face of the drill plate 818 and/or one of the bushings 822.

In some examples, as the operator 834 performs the drilling operation on the surface 826, coolant and/or other debris are collected within the housing 804 and/or the absorbent material 808. In some examples, after the drilling operation is performed, the operator 834 removes the drill plate assembly 800 from the surface 826 and decouples the drill plate 818 from the housing 804 to enable the material 808, the coolant and/or the cuttings to be accessed and/or discarded. In some examples, to perform another drilling operation, the material 808 is replaced with non-coolant saturated material (e.g., the material 808) and the drill plate assembly 800 is positioned on another surface to be drilled and the processes of FIG. 8 are repeated.

Figure 9:
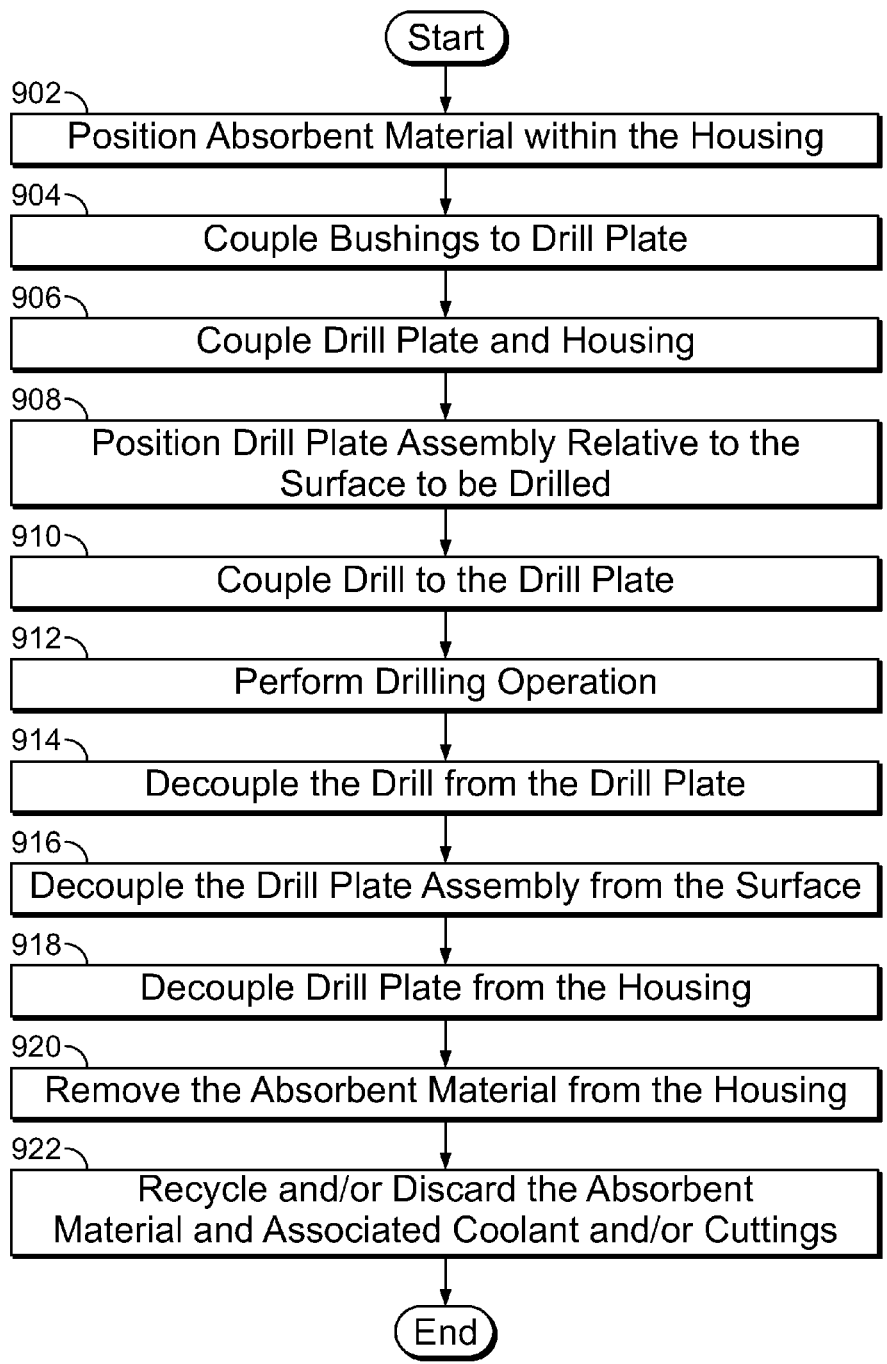
FIG. 9 is a flowchart representative of example processes that may be performed using the example drill plate assemblies disclosed herein.

The process of FIG. 9 begins with an absorbent material being positioned within the housing (block 902) by, for example, positioning the material 808 within the housing 804. Bushings are coupled to the drill plate (block 904) by, for example, positioning the bushings 822 within the third apertures 820 of the drill plate 818 and coupling the bushings 822 to the drill plate 818 via an interference fit and/or a fastener.

The drill plate is coupled to the housing (block 906) by, for example, coupling the drill plate 818 to the housing 804 to enclose (e.g., partially enclose) the absorbent material 808 within the housing 804. The drill plate assembly is then positioned relative to the surface to be drilled (block 908) by, for example, indexing and/or positioning the drill plate assembly 800 relative to the surface 826 and coupling the drill plate assembly 800 to the surface 826 via the fasteners 828, 830. In some examples, the drill plate assembly 800 is held in place relative to the surface 826 by extending the fasteners 828, 830 through corresponding apertures in the drill plate 818 and threading a nut and/or washer on the respective fasteners 828, 830.

A drilling operation is performed (912) by, for example, causing the drill 836 to drill a hole in the surface 826. The drill 836 is decoupled from the drill plate 818 (block 914). The drill plate assembly is decoupled from the surface (block 916) by, for example, unfastening the fasteners 828, 830 and removing the drill plate assembly 800 from the surface 826. The drill plate is decoupled from the housing (block 918) by, for example, removing the drill plate 818 from the housing 804. The absorbent material is removed from the housing (block 920) by, for example, removing the absorbent material 808 including the associated coolant, drilling fluid and debris from the housing 804. The absorbent material and the associated coolant and/or cuttings are recycled and/or discarded (block 922).

While an example process of performing a drilling operation using the example drill plate assemblies is disclosed in FIG. 9, many other methods of using the example drill plate assemblies may alternatively be used. For example, the order of execution of the blocks may be changed, and/or some of the blocks described may be changed, eliminated, or combined.

From the foregoing, it will be appreciated that the above disclosed methods, apparatus and articles of manufacture relate to providing localized containment of drilling fluid and/or chips produced when performing machining and/or drilling operations at the point and/or location of manufacturing. In some examples, the machining and/or drilling operations are performed when assembling a vehicle such an aircraft.

In some examples, the drill plate assemblies include an example gutter dam housing in which an example absorbent material is disposed. In some examples, the example gutter dam housing and the example absorbent material are indexed and/or concentrically disposed about a center of the drilling point. In some examples, an example drill bushing is used to couple the gutter dam housing and the example absorbent material. In some examples, an example cover is coupled to the gutter dam housing to enclose and/or encapsulate the example absorbent material within the example drill plate assembly.

The examples disclosed herein provide for localized containment of fluids and/or chips related to and/or produced during machining and/or drilling processes. The examples disclosed herein provide localized containment of fluids and/or chips related to machining and/or drilling processes at the point and/or location of performing such machining and/or drilling processes. The examples disclosed herein relate to an example localized gutter housing in which an example absorbent material and/or batting is inserted to contain and/or capture drilling fluid and/or cuttings produced during manufacturing processes. The examples disclosed herein relate to example localized gutter housings that are indexed and/or placed concentric about a drilling center point to seal and isolate drilling fluids and/or associated cuttings to a local area and/or within the example gutter housing.

An exampling method includes positioning an absorbent material between a drill plate and a surface to be drilled; performing a drilling operation on the surface including flowing coolant through a drill; and capturing at least some of the coolant in the absorbent material. In some examples, the positioning of the absorbent material includes disposing the absorbent material within a housing and coupling the drill plate to the housing. In some examples, the housing includes a contour corresponding to a contour of the surface. In some examples, the method includes positioning a bushing through substantially coaxial apertures of the drill plate and the housing.

In some examples, performing the drilling operation includes coupling a drill to a face of the drill plate or to the bushing. In some examples, the positioning of the absorbent material includes coupling the absorbent material and the drill plate to the surface. In some examples, the method includes removing the drill plate and absorbent material from being adjacent the surface after the performing of the drilling operation. In some examples, the surface to be drilled includes a surface of a fuselage, and the positioning of the absorbent material includes coupling the drill plate and the absorbent material to the surface of the fuselage.

An example apparatus includes a housing defining a cavity; an absorbent material to be disposed within the cavity; and a drill plate to be coupled to the housing, the absorbent material to be between the drill plate and a surface to be drilled during a drilling operation, the absorbent material to collect coolant during the drilling operation. In some examples, the housing, the absorbent material, and the drill plate define substantially coaxial apertures through which a drill bit is to extend during the drilling operation. In some examples, the drilling operation is a first drilling operation and the coaxial apertures are first coaxial apertures, the housing, the absorbent material, and the drill plate define second substantially coaxial apertures through which the drill bit is to extend during a second drilling operation. In some examples, the apparatus includes a bushing coupled to the drill plate, the bushing to extend through the coaxial apertures. In some examples, the bushing is coupled to the drill plate via an inference fit. In some examples, the surface is a first surface, the housing includes a second surface having a contour that corresponds to a contour of the first surface.

An example apparatus includes a bushing through which a drill bit is to extend during a drilling operation; and an absorbent material surrounding the bushing, the absorbent material to collect coolant during the drilling operation. In some examples, the apparatus includes a fuselage, the bushing and the absorbent material to be coupled to the fuselage to enable the drilling operation to be performed on a surface of the fuselage. In some examples, the absorbent material defines an aperture through which the bushing extends. In some examples, the apparatus includes a housing in which the absorbent material is disposed and through which the bushing extends. In some examples, a cover of the housing includes a drill plate. In some examples, the housing includes a contour that corresponds to a contour of a surface to be drilled.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A method, comprising:
    positioning an absorbent material between a drill plate and a surface to be drilled;
    performing a drilling operation on the surface including flowing coolant through a drill, wherein prior to performing the drilling operation, the absorbent material is not saturated with coolant; and
    capturing at least some of the coolant in the absorbent material during the drilling operation.

2. The method of claim 1, wherein positioning the absorbent material includes disposing the absorbent material within a housing and coupling the drill plate to the housing.

3. The method of claim 2, wherein the housing includes a contour corresponding to a contour of the surface.

4. The method of claim 2, further including positioning a bushing through substantially coaxial apertures of the drill plate and the housing.

5. The method of claim 4, wherein performing the drilling operation includes coupling a drill to a face of the drill plate or to the bushing.

6. The method of claim 1, wherein positioning the absorbent material includes coupling the absorbent material and the drill plate to the surface.

7. The method of claim 1, wherein the surface to be drilled includes a surface of a fuselage, and the positioning of the absorbent material includes coupling the drill plate and the absorbent material to the surface of the fuselage.

8. An apparatus, comprising:
    a housing defining a cavity;
    an absorbent material to be disposed within the cavity;
    a drill plate to be coupled to the housing, the absorbent material to be between the drill plate and a surface to be drilled during a drilling operation, the absorbent material to collect coolant during the drilling operation; and
    a bushing extending through the drill plate and the cavity of the housing to enable an end of the bushing to be disposed immediately adjacent the surface to be drilled during the drilling operation.

9. The apparatus of claim 8, wherein the housing, the absorbent material, and the drill plate define substantially coaxial apertures through which a drill bit is to extend during the drilling operation.

10. An apparatus, comprising:
    a housing defining a cavity;
    an absorbent material to be disposed within the cavity; and
    a drill plate to be coupled to the housing, the absorbent material to be between the drill plate and a surface to be drilled during a drilling operation, the absorbent material to collect coolant during the drilling operation, the housing, the absorbent material, and the drill plate define substantially coaxial apertures through which a drill bit is to extend during the drilling operation, wherein the drilling operation is a first drilling operation and the coaxial apertures are first coaxial apertures, wherein the housing, the absorbent material, and the drill plate define second substantially coaxial apertures through which the drill bit is to extend during a second drilling operation.

11. An apparatus, comprising:
    a housing defining a cavity;
    an absorbent material to be disposed within the cavity;
    a drill plate to be coupled to the housing, the absorbent material to be between the drill plate and a surface to be drilled during a drilling operation, the absorbent material to collect coolant during the drilling operation, wherein the housing, the absorbent material, and the drill plate define substantially coaxial apertures through which a drill bit is to extend during the drilling operation; and
    a bushing coupled to the drill plate, the bushing to extend through the coaxial apertures.

12. The apparatus of claim 11, wherein the bushing is coupled to the drill plate via an interference fit.

13. The apparatus of claim 8, wherein the surface is a first surface, the housing includes a second surface having a contour that corresponds to a contour of the first surface.

14. An apparatus, comprising:
a bushing through which a drill bit is to extend during a drilling operation, the bushing structured to enable the drill bit to rotate relative to the bushing during the drilling operation; and
an absorbent material surrounding the bushing, the absorbent material to collect coolant during the drilling operation.

15. The apparatus of claim 14, further including a fuselage, the bushing, and the absorbent material to be coupled to the fuselage to enable the drilling operation to be performed on a surface of the fuselage.

16. The apparatus of claim 14, wherein the absorbent material defines an aperture through which the bushing extends.

17. The apparatus of claim 14, further including a housing in which the absorbent material is disposed and through which the bushing extends.

18. The apparatus of claim 17, wherein a cover of the housing includes a drill plate.

19. The apparatus of claim 17, wherein the housing includes a contour that corresponds to a contour of a surface to be drilled.

20. The apparatus of claim 17, wherein the bushing includes a coupling to couple the bushing to a drill during the drilling operation.

21. A method, comprising:
positioning an absorbent material between a drill plate and a surface to be drilled, wherein positioning the absorbent material includes disposing the absorbent material within a housing and coupling the drill plate to the housing;
performing a drilling operation on the surface including flowing coolant through a drill;
capturing at least some of the coolant in the absorbent material; and
enabling coolant to flow out of the absorbent material and through a drain during the drilling operation.

22. The method of claim 1, wherein flowing coolant through the drill includes flowing coolant through a drill bit used during the drilling operation.

* * * * *